W. POTTER.
Machine for Jointing and Dressing Circular-Saws.
No. 168,580. Patented Oct. 11, 1875.
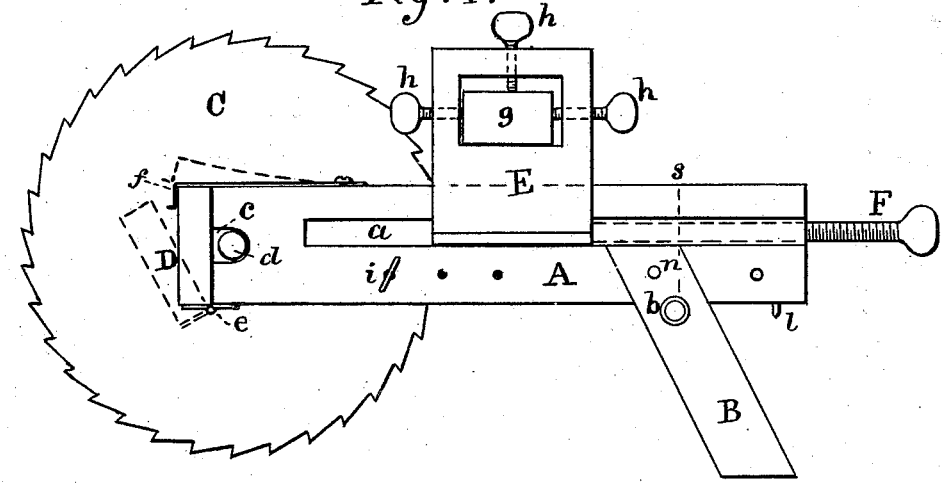
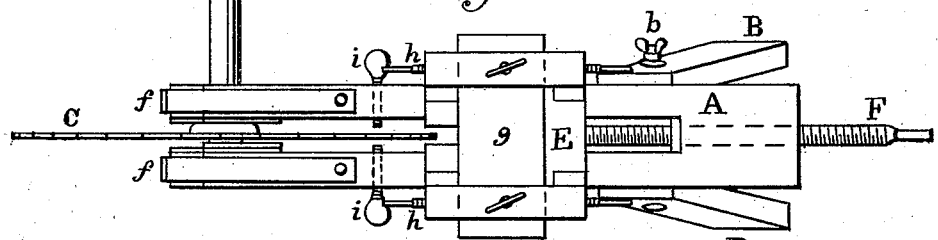
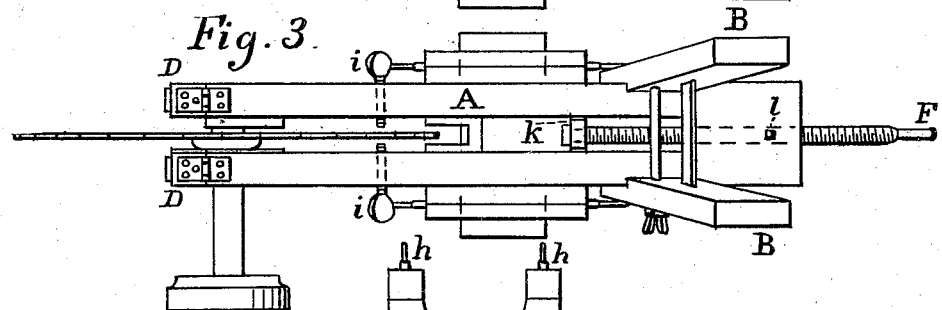
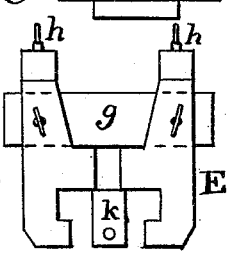
Witnesses:
H. A. Daniels
Theodore Mungen
Inventor:
William Potter
By J. S. Kellogg
Attorney

UNITED STATES PATENT OFFICE.

WILLIAM POTTER, OF LEYDEN, NEW YORK.

IMPROVEMENT IN MACHINES FOR JOINTING AND DRESSING CIRCULAR SAWS.

Specification forming part of Letters Patent No. 168,580, dated October 11, 1875; application filed July 30, 1875.

*To all whom it may concern:*

Be it known that I, WILLIAM POTTER, of Leyden, in the county of Lewis and State of New York, have invented certain Improvements in Machines for Jointing and Dressing Circular Saws, of which the following is a specification:

My invention relates to machines for sharpening and dressing circular saws; and consists in certain improvements in the construction of the same, as hereinafter more fully shown and described.

In the accompanying drawing, forming a part of this specification herein, Figure 1 represents a side view of my improved machine in position for operation. Fig. 2 is a plan view of same. Fig. 3 is a plan view of bottom. Fig. 4 is a front view of that part of the frame which holds the stone.

The object of my invention is to provide a machine for jointing and sharpening circular saws which, from its adjustability, its manner of attachment, and connection with the mandrel or shaft of the saw, is rapid and accurate in its operation, so that the faces of the teeth are left perfectly at right angles with the sides of the saw.

In the drawing referred to, A designates the main frame of the machine, same being made solid at one end, as shown, and divided by an opening extending from the point marked S to the other end of the frame, thus forming two arms or supports. A slot made in each side of frame A, and extending lengthwise, is indicated by $a$. At the rear end the said frame is provided with the legs B, held firmly by the screw-bolt $b$ and pins $n$. At the forward extremities the arms of the frame have openings $c$ formed to receive the mandrel or shaft $d$ of the saw C. These openings $c$ are closed by means of the pieces D, hinged at $e$, and held in place, when closed, by means of the springs $f$, fastened to the frame. E designates the frame which holds the sharpening-stone $g$, which is, preferably, a piece of emery or fine whetstone, said frame E extending across and resting upon the frame A. The frame E is provided with the set-screws $h$, to hold the stone $g$ and adjust the same in position; and, further, said frame extends downward outside of frame A, and has its lower extremities formed to enter the slots $a$, the latter serving as additional guides in the movement of frame E upon the frame A. A projection, $k$, extends downward from the frame E, and between the arms of frame A. To this projection is loosely riveted or coupled the end of the screw F, the latter being used to move frame E forward or backward on the frame A. Two screws, $i$, placed directly opposite each other, pass inwardly through the arms of the frame A, and serve to steady the saw in its revolutions.

It being desirable occasionally to remove the legs B from the frame, this being readily done by removing the screw-bolt $b$, the spur $l$ is provided, to hold the frame A in position when the legs are removed.

In operation, the arms of the frame A are clamped to the shaft of the saw by means of the hinged pieces D and the springs $f$, the saw extending between the said arms, and the said shaft passing through the openings $c$. The sharpening-stone $g$ is placed in the frame E, and fixed therein by means of the screws $h$. The frame A then standing exactly at right angles with the shaft of the saw, the latter is put in motion, and the frame E is moved toward the saw by means of the screw F passing through the rear end of the frame, as shown.

By this construction and adjustment of the same, a jointing of the saw is effected, which is on a line perfectly parallel with the center line of the shaft, this being chiefly effected by the arms of the frame A being securely held in their relative position at right angles with the shaft of the saw.

This result is very desirable, as practice has shown that there is always more or less deflection from the center in the operation of a circular saw upon its shaft, and unless a perfect joint is obtained, the cut of the saw is irregular, or draws in or out, and heats.

Having described my invention, I claim—

In a machine for jointing and dressing circular saws, the slotted frame A, having the two arms provided with clamps and openings, to receive and hold the saw-shaft, in combination with the moving frame E and the screw F, all constructed to operate as set forth.

Witness my signature hereto in the presence of two witnesses.

WILLIAM POTTER.

Witnesses:
WALTER BALLOU,
EDDIE L. COMSTOCK.